(12) United States Patent
DeRosa et al.

(10) Patent No.: US 10,942,076 B2
(45) Date of Patent: *Mar. 9, 2021

(54) SENSOR HAVING THERMAL GRADIENTS

(71) Applicant: KULITE SEMICONDUCTOR PRODUCTS, INC., Leonia, NJ (US)

(72) Inventors: Louis DeRosa, Wayne, NJ (US); Robert Gardner, Westwood, NJ (US); Richard Martin, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,790

(22) Filed: Jul. 17, 2019

(65) Prior Publication Data
US 2019/0339148 A1 Nov. 7, 2019

Related U.S. Application Data

(63) Continuation of application No. 15/689,588, filed on Aug. 29, 2017, now Pat. No. 10,371,590, which is a continuation of application No. 15/343,923, filed on Nov. 4, 2016, now Pat. No. 9,772,244, which is a continuation of application No. 14/162,036, filed on Jan. 23, 2014, now Pat. No. 9,523,619.

(Continued)

(51) Int. Cl.
*G01L 9/06* (2006.01)
*G01L 13/02* (2006.01)
*G01L 19/04* (2006.01)

(52) U.S. Cl.
CPC ............. *G01L 9/06* (2013.01); *G01L 13/025* (2013.01); *G01L 19/04* (2013.01)

(58) Field of Classification Search
None
See application file for complete search history.

(56) References Cited

U.S. PATENT DOCUMENTS 3,699,811 A 10/1972 Maiden et al.
4,442,716 A * 4/1984 Coe .................. G01L 19/147
340/870.13

(Continued)

OTHER PUBLICATIONS

Authors: Demetri Telionis, Yihong Yang and Othon Rediniotis, Title: Recent Developments in Multi-Hole Probe (MHP) Technology, Date: Nov. 15-20, 2009, Publishing: Proceedings of COBEM 2009, 20th International Congress of Mechanical Engineering, pages total: 29.

*Primary Examiner* — Harshad R Patel
(74) *Attorney, Agent, or Firm* — Troutman Pepper Hamilton Sanders LLP; James E. Schutz; Mark Lehi Jones

(57) ABSTRACT

The invention is an improved sensor assembly including a housing; a first header and a second header coupled to the housing; a first transducer coupled to the first header and a second transducer coupled to the second header. The first transducer is configured to measure a first pressure to generate a first pressure signal. The second transducer is configured to measure a second pressure to generate a second pressure signal. The first transducer and the second transducer are positioned in the housing such that a first temperature of the first transducer is about equivalent to a second temperature of the second transducer during operation of the sensor assembly.

20 Claims, 4 Drawing Sheets

Related U.S. Application Data

(60) Provisional application No. 61/878,666, filed on Sep. 17, 2013.

(56) References Cited

U.S. PATENT DOCUMENTS

| | | | |
|---|---|---|---|
| 4,442,720 | A | 4/1984 | Apley et al. |
| 4,476,707 | A | 10/1984 | Burns et al. |
| 5,022,270 | A | 6/1991 | Rud, Jr. |
| 5,955,771 | A | 9/1999 | Kurtz et al. |
| 6,312,061 | B1 | 11/2001 | Schliebe et al. |
| 6,427,530 | B1 | 8/2002 | Krueger et al. |
| 6,612,179 | B1 * | 9/2003 | Kurtz .................... G01L 9/0052 73/727 |
| 7,057,247 | B2 | 6/2006 | Kurtz et al. |
| 7,186,131 | B2 | 3/2007 | Kurtz et al. |
| 7,201,067 | B2 | 4/2007 | Kurtz et al. |
| 7,258,018 | B2 | 8/2007 | Kurtz et al. |
| 7,526,962 | B1 | 5/2009 | Kurtz et al. |
| 7,827,866 | B2 * | 11/2010 | Galinsky ............. G01L 19/0672 73/716 |
| 8,069,732 | B2 | 12/2011 | Kurtz |
| 9,523,619 | B2 * | 12/2016 | DeRosa .................... G01L 9/06 |
| 9,772,244 | B2 | 9/2017 | DeRosa et al. |
| 10,371,590 | B2 * | 8/2019 | DeRosa ................ G01L 13/025 |
| 2009/0314094 | A1 | 12/2009 | Kurtz |
| 2010/0107774 | A1 | 5/2010 | Kurtz |
| 2015/0211905 | A1 * | 7/2015 | Drachmann ............ G01F 1/662 73/861.28 |

\* cited by examiner

SENSOR HAVING THERMAL GRADIENTS

CROSS-REFERENCE TO RELATED APPLICATIONS

This application is a continuation claiming priority under 35 U.S.C. § 120 to U.S. patent application Ser. No. 15/689,588, filed 29 Aug. 2017, and published as U.S. Patent Application Publication No. US2017/0363496 on 21 Dec. 2017, entitled "SENSOR HAVING THERMAL GRADIENTS." Application Ser. No. 15/689,588 is a continuation claiming priority under 35 U.S.C. § 120 to U.S. patent application Ser. No. 15/343,923, filed 4 Nov. 2016, and published as U.S. Patent Application Publication No. US2017/0074739 on 16 Mar. 2017, entitled "SENSOR HAVING THERMAL GRADIENTS," and issued as U.S. Pat. No. 9,772,224 on 26 Sep. 2017. Application Ser. No. 15/343,923 is a continuation claiming priority under 35 U.S.C. § 120 to U.S. patent application Ser. No. 14/162,036, filed 23 Jan. 2014, published as U.S. Patent Application Publication No. US2015/0204749 on 23 Jul. 2014, entitled "SENSOR HAVING THERMAL GRADIENTS," and issued as U.S. Pat. No. 9,523,619 on 20 Dec. 2016. Application Ser. No. 14/162,036 claims priority under 35 U.S.C. § 119(e) to U.S. Provisional Patent Application No. 61/878,666, entitled "SENSOR FOR USE WITH THERMAL GRADIENTS," filed 17 Sep. 2013, all of which are hereby incorporated by reference as if fully set forth herein.

TECHNICAL FIELD

This disclosure generally relates to sensors and more particularly to a sensor having thermal gradients.

BACKGROUND

The measurement of differential pressure is important in many applications such as those measuring oil pressures, fuel pressure, hydraulic pressure, air pressure, and the like. In many of these applications, it may not be desirable to measure differential pressure by applying different pressures to opposite sides of a sensor's diaphragm. Instead, a half-bridge sensor configuration may be used, such as described in U.S. Pat. No. 4,695,817, entitled "ENVIRONMENTALLY PROTECTED PRESSURE TRANSDUCERS EMPLOYING TWO ELECTRICALLY INTERCONNECTED TRANSDUCER ARRAYS," issued Sep. 22, 1987 to Dr. Anthony D. Kurtz et al, and assigned to Kulite Semiconductor Products, Inc., the assignee herein. This configuration has many benefits but may be susceptible to temperature differences, since each side of the differential sensor may be physically located in different environments. In some applications, a hot liquid such as engine oil may be applied to the front-side of the sensor's diaphragm, while a cool gas such as atmospheric air may be applied to the back-side of the sensor's diaphragm. In this case, compensating for the temperature difference between each side of the sensor's diaphragm may be difficult. Typical temperature compensation of half-bridge sensors assume that both sensors are at the same temperature, so that any temperature effects may be compensated using temperature compensation techniques such as described in U.S. Pat. No. 3,245,252, entitled "TEMPERATURE COMPENSATED SEMICONDUCTOR STRAIN GAGE UNIT" issued Apr. 12, 1966 to Dr. Anthony Kurtz et al., and assigned to Kulite Semiconductor Products, Inc., the assignee herein.

FIG. 1 illustrates a prior art sensor assembly 100. The prior art sensor assembly 100 includes a first transducer 101, a first header 102, a housing 103, a second transducer 104, a second header 105, a shell 106, and a main port 107. In FIG. 1, the first transducer 101 forms a first half of a Wheatstone bridge and the second transducer 104 forms a second half of the Wheatstone bridge. The first transducer 101 is disposed within the first header 102, which is directly connected to the housing 103. Pressure at the main port 107 is applied to a front-side of the first transducer 101. The second transducer 104 is disposed within the second header 105, which is connected to the prior art sensor assembly 100 using the shell 106. The shell 106 may not transfer heat efficiently, so any uneven temperatures applied at the main port 107 of the sensor assembly 100 may cause a large thermal gradient across the body of the sensor assembly 100. The sensor assembly 100 may use the first transducer 101 to measure a first difference between a main pressure at the main port 107 and a third pressure such as atmospheric pressure. The sensor assembly 100 may use the second transducer 104 to measure a second difference between a reference pressure and the third pressure such as atmospheric pressure.

SUMMARY OF THE DISCLOSURE

Briefly described, embodiments of the present invention relate to a sensor having thermal gradients. In one embodiment, a sensor assembly may be configured to include a first header and a second header, a housing, and a first transducer and a second transducer. The housing may be coupled to the first header and the second header. Further, the first transducer may be coupled to the first header. The first transducer may be configured to receive a first pressure, measure the first pressure and output a first pressure signal associated with the first pressure. Similarly, the second transducer may be configured to receive a second pressure, measure the second pressure and output a second pressure signal associated with the second pressure. Finally, the first transducer and the second transducer may be positioned in the housing such that a first temperature of the first transducer is about equivalent to a second temperature of the second transducer during operation of the sensor assembly.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
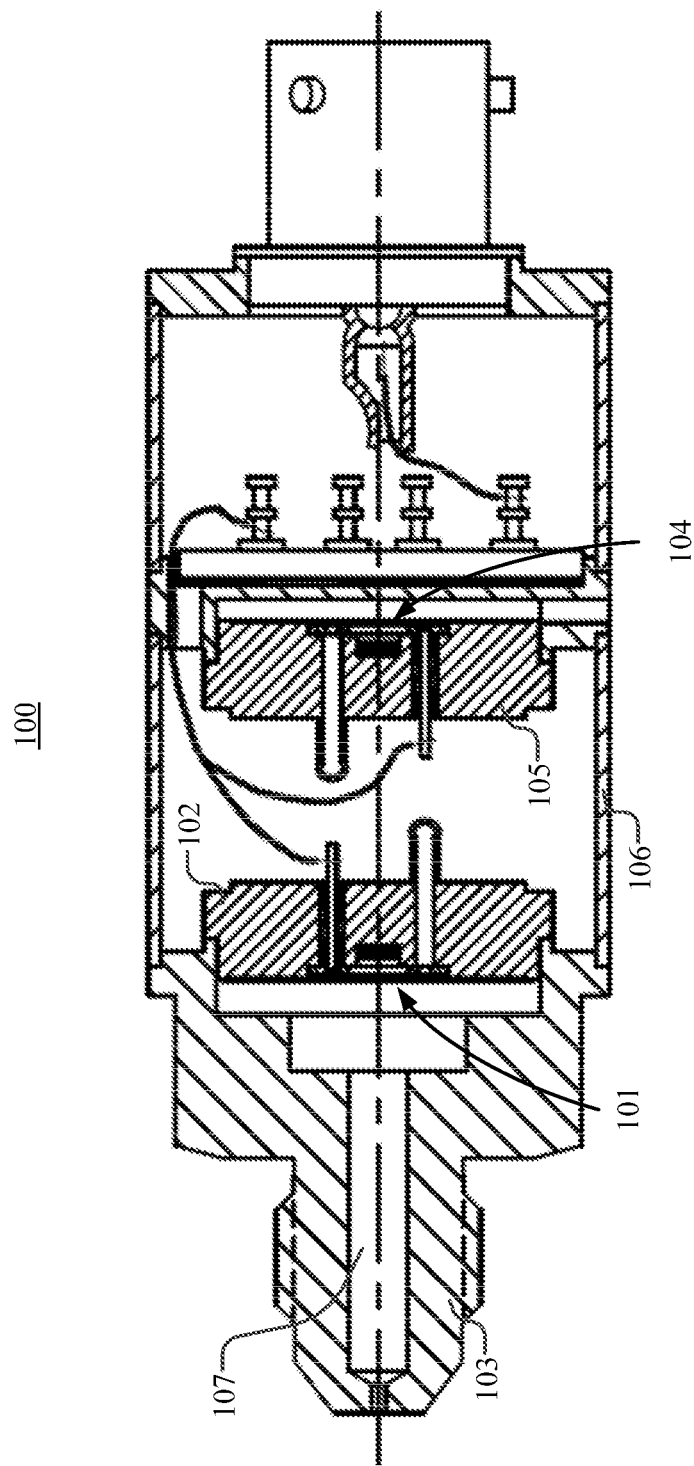
FIG. 1 illustrates a prior art sensor assembly.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a sensor having thermal gradients. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Figure 2:
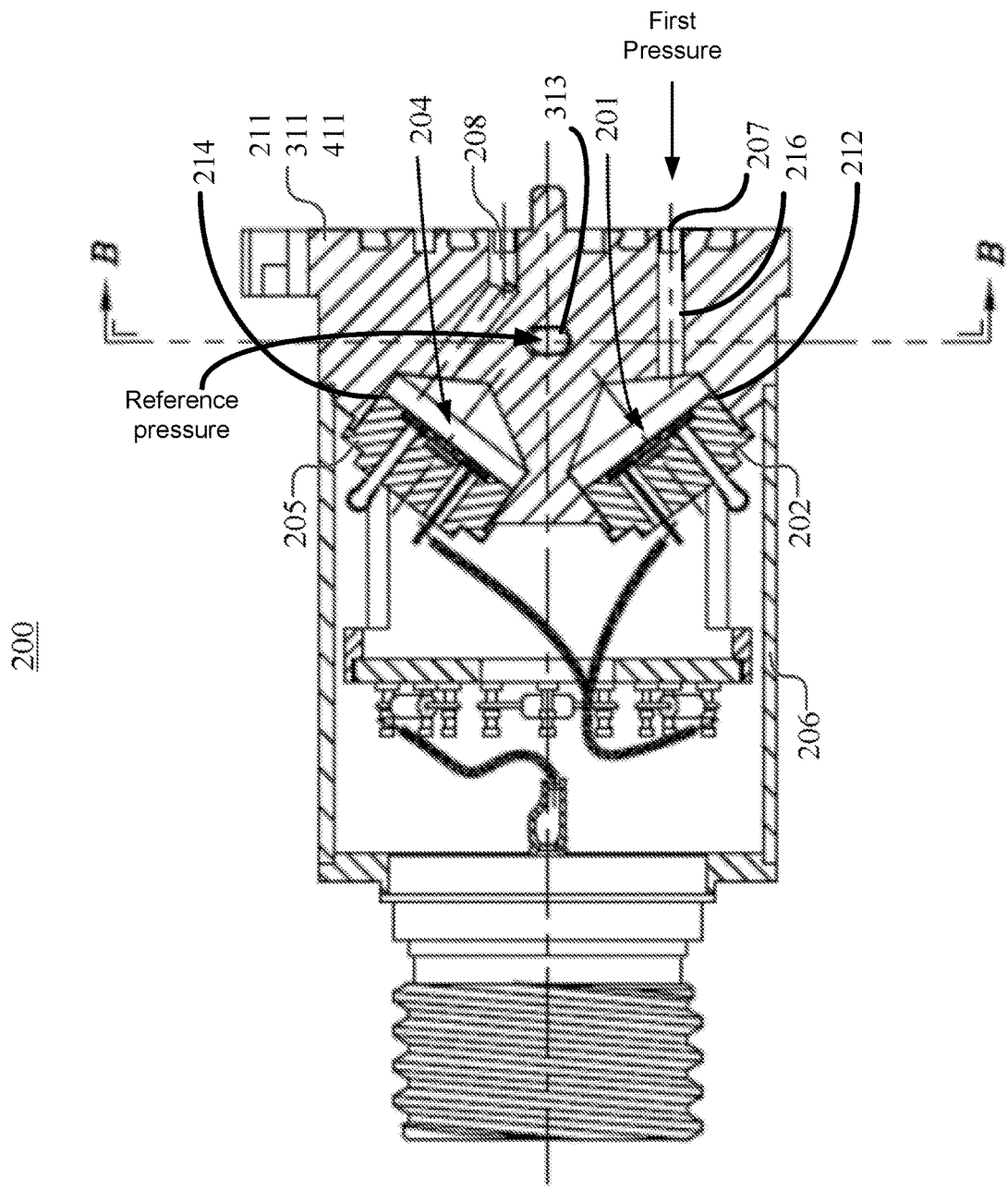
FIG. 2 shows a longitudinal cross-sectional view of one embodiment of a sensor assembly having thermal gradients in accordance with various aspects set forth herein.
Figure 3:
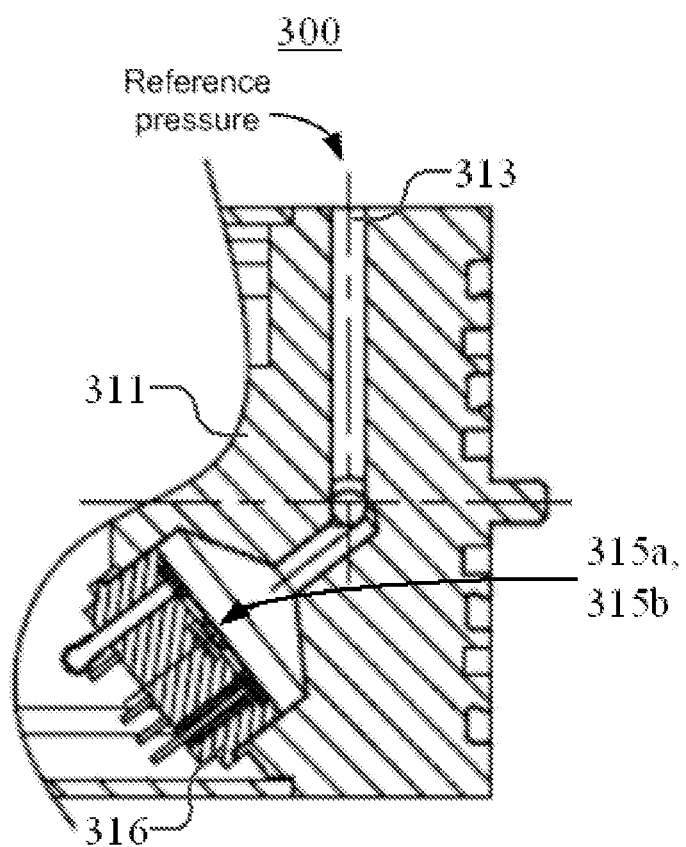
FIG. 3 shows a partial longitudinal cross-sectional view of another embodiment of a sensor assembly having thermal gradients in accordance with various aspects set forth herein.
Figure 4:
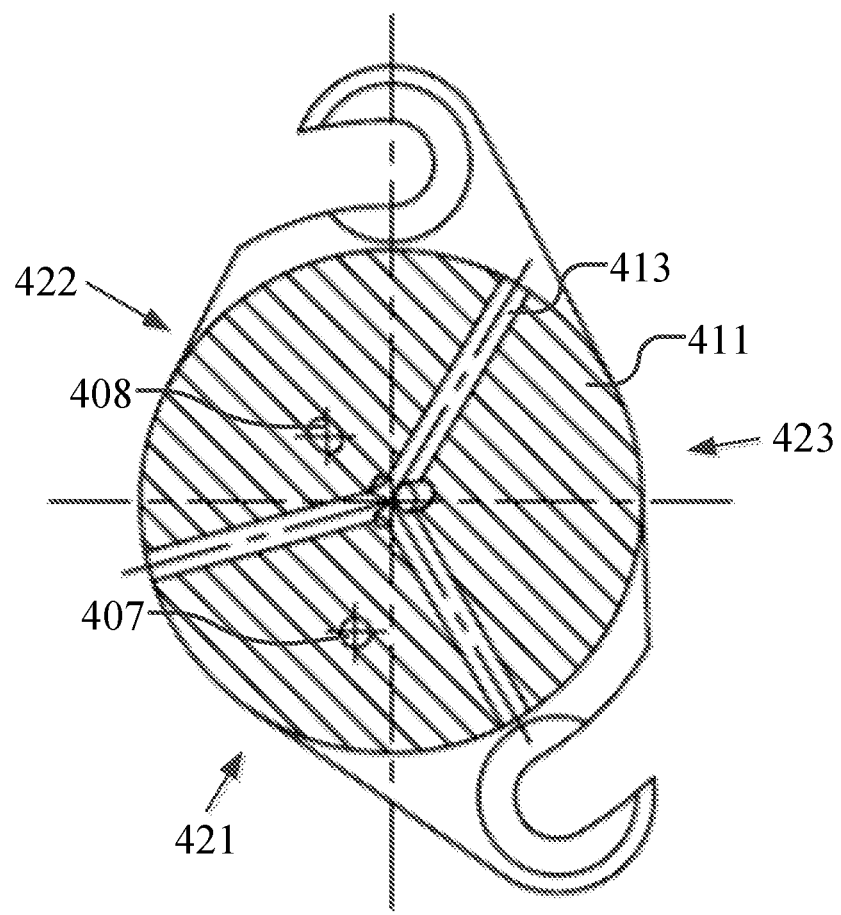
FIG. 4 shows a top view of another embodiment of a sensor assembly having thermal gradients in accordance with various aspects set forth herein.

This disclosure presents a sensor having thermal gradients. For instance, by configuring a sensor in accordance with various aspects described herein, an improved pressure measurement capability of a sensor having a thermal gradient is provided. For example, FIG. 2 shows a longitudinal cross-sectional view of one embodiment of a sensor assembly 200 having thermal gradients in accordance with various aspects set forth herein. In FIG. 2, the sensor assembly 200 may be configured to include a first transducer 201, a first header 202, a second transducer 204, a second header 205, a shell 206, a first port 207 configured to communicate a first pressure to the first transducer via a first channel 216, a second port 208, one or more side ports 313, and a housing 211, 311, 411. The housing 211 shown in FIG. 2 is the same housing 311 as shown in FIG. 3 and housing 411 as shown in FIG. 4. The housing 211, 311, 411 may include a first recess 212 configured to accept and secure the first transducer 201. The housing 211, 311, 411 may include a second recess 214 configured to accept and secure the second transducer 204. The first transducer 201 may form a first half of a piezoresistive network and the second transducer 204 may form a second half of the piezoresistive network. In one example, a piezoresistive network may be a Wheatstone bridge. A half of a piezoresistive network may also be referred to as a half-bridge transducer or half of a Wheatstone bridge. The sensor assembly 200 may use the first transducer 201 to measure a first pressure from the first port 207. The sensor assembly 200 may use the second transducer 204 to measure a second pressure from the second port 208 and/or one or more of the side ports 313 distributed around a side portion of the housing. In one example, the first pressure may be a main pressure and the second pressure may be a reference pressure, which may be used to determine a differential pressure signal. In another example, the first pressure may be a first main pressure and the second pressure may be a second main pressure. In another example, the first pressure may be a main pressure and the second pressure may be atmospheric pressure. The first pressure signal and the second pressure signal may be provided by the sensor assembly 200 to a remote device.

In FIG. 2, the sensor assembly 200 may be configured to include the housing 211 at a front portion of the sensor assembly 200. The housing 211 may be used to attach or secure the sensor assembly 200 to another structure, protect all or a portion of the sensor assembly 200, provide a means to handle or place the sensor assembly 200, or another similar characteristic. The housing 211 may be used to form an O-ring seal, may be threaded, may include a series of O-rings or bolts, or the like so that the sensor assembly 200 may be attached to another structure. In one example, the housing 211 may be made of a thermally conductive material such as metal. The first transducer 201 may be disposed on, near or within the first header 202. For example, the first transducer 201 may be secured, bonded, welded, press fit or the like to the first header 202. Similarly, the second transducer 204 may be disposed on, near or within the second header 205. For example, the second transducer 204 may be secured, bonded, welded, press fit or the like to the second header 205. The housing 211 may be disposed around and define the first port 207 and the second port 208. The first port 207 may allow the first pressure to enter the housing 211 for measurement by the first transducer 201. The second port 208 may allow the second pressure to enter the housing 211 for measurement by the second transducer 204. The first header 202 and the second header 205 may be disposed on, near or within the housing 211. For example, the first header 202 and the second header 205 may be secured, bonded, welded, press fit or the like to the housing 211.

Furthermore, since the first header 202 and the second header 205 are physically proximate and coupled to the housing 211, the housing 211 may be used to temperature regulate the first transducer 201 and the second transducer 204, resulting in the first transducer 201 and the second transducer 204 having about equivalent temperatures during operation of the sensor assembly 200. For instance, the first transducer 201 and the second transducer 204 may have temperatures within about two degrees Celsius (±2° C.), about five degrees Celsius (±5° C.), about ten degrees Celsius (±10° C.), or the like during operation of the sensor assembly 200. The first transducer 201 and the second transducer 204 may be about laterally equidistant from a front surface of the housing 211. Further, the first transducer 201 and the second transducer 204 may be symmetrically positioned relative to a longitudinal axis of the sensor assembly 200. In addition to the physical proximity of the first transducer 201 and the second transducer 204 to the housing 211, an increased mass of the housing 211 may also result in the first transducer 201 and the second transducer 204 having about equivalent temperatures during operation of the sensor assembly 200, which may allow for the use of standard passive or active temperature compensation. Further, it may not be necessary to characterize the sensor assembly 200 using a temperature gradient, which may be difficult to perform in a production setting. In one example, the mass of the housing 211 may be at least a combined mass of the first transducer 201, the first header 202, the second transducer 204 and the second header 205. A person having ordinary skill in the art will recognize various techniques for performing temperature compensation of sensor measurements.

In another embodiment, a sensor assembly may include an electronic component such as an electronic circuit, a field programmable gate array (FPGA), a processor, a controller, or the like. The electronic component may receive a first pressure signal from a first transducer and a second pressure signal from a second transducer. The electronic component may determine a differential pressure signal using the first pressure signal and the second pressure signal.

In another embodiment, each of a first header and a second header may be tilted relative to a longitudinal axis of a sensor assembly. In one example, each of the first header and the second header may be disposed about parallel, about thirty degrees (30°), about forty-five degrees (45°), about sixty degrees (60°), about perpendicular or the like relative to the longitudinal axis of the sensor assembly.

FIG. 3 shows a partial longitudinal cross-sectional view of another embodiment of a sensor assembly 300 having thermal gradients in accordance with various aspects set forth herein. In FIG. 3, the sensor assembly 300 may be configured to include a first transducer, a second transducer, a third transducer 315a, a fourth transducer 315b, a first header, a second header, a third header 316, a first port, a second port, a third port 313, and a housing 311. In one example, the first transducer may form a first half of a first piezoresistive network and the third transducer 315a may form a second half of the first piezoresistive network. Further, the second transducer may form a first half of a second piezoresistive network and the fourth transducer 315b may form a second half of the second piezoresistive network. The first transducer may be disposed on, near or within the first header. For example, the first transducer may be secured, bonded, welded, press fit or the like to the first header. The second transducer may be disposed on, near or within the second header. For example, the second transducer may be secured, bonded, welded, press fit or the like to the second header. The third transducer 315a and the fourth transducer 315b may be disposed on, near or within the third header 316. For example, the third transducer 315a and the fourth transducer 315b may be secured, bonded, welded, press fit or the like to the third header 316. The housing 311 may be disposed around and form the first port, the second port, and the third port 313. The first port may allow the first pressure to enter the housing 311 for measurement by the first transducer. The second port may allow the second pressure to enter the housing 311 for measurement by the second transducer. The third port 313 may allow the third pressure to enter the third header 316 for measurement by the third transducer 315a or the fourth transducer 315b.

Furthermore, since the first header, the second header and the third header 316 are physically proximate and coupled to the housing 311, the housing 311 may be used to temperature regulate the first transducer, the second transducer, the third transducer 315a and the fourth transducer 315b, resulting in the first transducer, the second transducer, the third transducer 315a and the fourth transducer 315b having about equivalent temperatures during operation of the sensor assembly 300. For instance, the first transducer, the second transducer, the third transducer 315a and the fourth transducer 315b may have temperatures within about two degrees Celsius (±2° C.), about five degrees Celsius (±5° C.), about ten degrees Celsius (±10° C.), or the like during operation of the sensor assembly 300. The first transducer, the second transducer, the third transducer 315a and the fourth transducer 315b may be about laterally equidistant from a front surface of the housing 311. Further, the first transducer, the second transducer, the third transducer 315a and the fourth transducer 315b may be symmetrically positioned relative to a longitudinal axis of the sensor assembly 200. In addition to the physical proximity of the first header, the second header and the third header 316 to the housing 311, an increased mass of the housing 311 may also result in the first transducer, the second transducer, the third transducer 315a and the fourth transducer 315b having about equivalent temperatures during operation of the sensor assembly 300, which may allow use of standard passive or active temperature compensation. In one example, a mass of the housing 311 may be at least a mass of the first header, the second header and the third header 316 and the first transducer, the second transducer, the third transducer 315a and the fourth transducer 315b.

In FIG. 3, the first transducer may receive from the first port and measure the first pressure to generate a first pressure signal. The second transducer may receive from the second port and measure the second pressure to generate a second pressure signal. Also, the third transducer 315a and the fourth transducer 315b may receive from the third port and measure the third pressure and the fourth pressure to generate a third pressure signal and a fourth pressure signal, respectively. A first differential pressure signal may be generated by determining a first difference between the first pressure signal and the third pressure signal. Similarly, a second differential pressure signal may be generated by determining a second difference between the second pressure signal and the fourth pressure signal. The first differential pressure signal and the second differential pressure signal may be used to compensate for any thermal gradients in the sensor assembly 300. In one example, the first pressure may be a first main pressure, the second pressure may be a second main pressure and the third pressure may be a reference pressure, which may be used to determine a differential pressure signal. In another example, the first pressure and the second pressure may be the same pressure. The first pressure signal, the second pressure signal, the third pressure signal and the fourth pressure signal may be provided by the sensor assembly 300 to a remote device.

In another embodiment, a sensor assembly may include an electronic component such as an electronic circuit, a field programmable gate array (FPGA), a processor, a controller, or the like. The electronic component may receive a first pressure signal from a first transducer, a second pressure signal from a second transducer, a third pressure signal from a third transducer and a fourth pressure signal from a fourth transducer. In one example, the first pressure signal may be associated with a first main pressure, the second pressure signal may be associated with a second main pressure, and the third pressure signal and the fourth pressure signal may be associated with a reference pressure. The electronic component may determine a first differential pressure signal by determining a difference between the first pressure signal and the third pressure signal. Similarly, the electronic component may determine a second differential pressure signal by determining a difference between the second pressure signal and the fourth pressure signal. The electronic component may provide the first differential pressure signal and the second differential pressure signal to the remote device.

In another embodiment, each of a first header, a second header and a third header may be tilted relative to a longitudinal axis of a sensor assembly. In one example, each of the first header, the second header and the third header may be disposed about parallel, about thirty degrees (30°), about forty-five degrees (45°), about sixty degrees (60°), about perpendicular or the like relative to the longitudinal axis of the sensor assembly.

In another embodiment, a sensor assembly may be configured to include a first transducer, a second transducer, a third transducer, a fourth transducer, a first header, a second header, a third header, a fourth header, a first port, a second port, a third port, a fourth port and a housing. In one example, the first transducer may form a first half of a first piezoresistive network and the third transducer may form a second half of the first piezoresistive network. Further, the second transducer may form a first half of a second piezoresistive network and the fourth transducer may form a second half of the second piezoresistive network. The first transducer may be disposed on, near or within the first header. For example, the first transducer may be secured, bonded, welded, press fit or the like to the first header. The second transducer may be disposed on, near or within the second header. For example, the second transducer may be secured, bonded, welded, press fit or the like to the second header. The third transducer may be disposed on, near or within the third header. For example, the third transducer may be secured, bonded, welded, press fit or the like to the third header. The fourth transducer may be disposed on, near or within the third header. For example, the fourth transducer may be secured, bonded, welded, press fit or the like to the third header. The housing may be disposed around and form the first port, the second port, the third port and the fourth port. The first port may allow the first pressure to enter the housing for measurement by the first transducer. The second port may allow the second pressure to enter the housing for measurement by the second transducer. The third port may allow the third pressure to enter the third header for measurement by the third transducer. The fourth port may allow the fourth pressure to enter the fourth header for measurement by the fourth transducer.

Furthermore, since the first header, the second header, the third header and the fourth header are physically proximate and coupled to the housing, the housing may be used to temperature regulate the first transducer, the second transducer, the third transducer and the fourth transducer, resulting in the first transducer, the second transducer, the third transducer and the fourth transducer having about equivalent temperatures including during operation of the sensor assembly. For instance, the first transducer, the second transducer, the third transducer and the fourth transducer may have temperatures within about two degrees Celsius (±2° C.), about five degrees Celsius (±5° C.), about ten degrees Celsius (±10° C.), or the like including during operation of the sensor assembly. The first transducer, the second transducer, the third transducer and the fourth transducer may be about laterally equidistant from a front surface of the housing. Further, the first transducer, the second transducer, the third transducer and the fourth transducer may be symmetrically positioned relative to a longitudinal axis of the sensor assembly. In addition to the physical proximity of the first header, the second header, the third header and the fourth header to the housing, an increased mass of the housing may also result in the first transducer, the second transducer, the third transducer and the fourth transducer having about equivalent temperatures during operation of the sensor assembly, which may allow use of standard passive or active temperature compensation. In one example, a mass of the housing may be at least a mass of the first header, the second header, the third header and the fourth header, as well as the first transducer, the second transducer, the third transducer and the fourth transducer.

In the current embodiment, the first transducer may receive from the first port and measure the first pressure to generate a first pressure signal. Further, the second transducer may receive from the second port and measure the second pressure to generate a second pressure signal. The third transducer may receive from the third port and measure the third pressure to generate a third pressure signal. Also, the fourth transducer may receive from the fourth port and measure the fourth pressure to generate a fourth pressure signal. A first differential pressure signal may be generated by determining a first difference between the first pressure signal and the third pressure signal. Similarly, a second differential pressure signal may be generated by determining a second difference between the second pressure signal and the fourth pressure signal. The first differential pressure signal and the second differential pressure signal may be used to compensate for any thermal gradients in the sensor assembly. In one example, the first pressure may be a first main pressure, the second pressure may be a second main pressure, the third pressure may be a first reference pressure, and the fourth pressure may be a second referenced pressure. The first reference pressure and the second reference pressure may be atmospheric pressure. The first pressure signal, the second pressure signal, the third pressure signal and the fourth pressure signal may be provided by the sensor assembly to a remote device.

In another embodiment, each of a first header, a second header, a third header and a fourth header may be tilted relative to a longitudinal axis of the sensor assembly. In one example, each of the first header, the second header, the third header and the fourth header may be disposed about parallel, about thirty degrees (30°), about forty-five degrees (45°), about sixty degrees (60°), about perpendicular or the like relative to the longitudinal axis of the sensor assembly.

In another embodiment, a third header and a fourth header may be the same header.

In another embodiment, a third port and a fourth port may be the same port.

In another embodiment, a third transducer and a fourth transducer may be the same transducer.

FIG. 4 shows a top view of another embodiment of a sensor assembly 400 having thermal gradients in accordance with various aspects set forth herein. In FIG. 4, the sensor assembly 400 may be configured to include a first transducer, a second transducer, a third transducer, a fourth transducer, a first header, a second header, a third header, a first port 407, a second port 408, a third port 413, and a housing 411. The first header may be disposed within a first sector 421 of the sensor assembly 400, the second header may be disposed within a second sector 422 of the sensor assembly 400, and the third header may be disposed within a third sector 423 of the sensor assembly 400. Similarly, the first transducer may be disposed within the first sector 421 of the sensor assembly 400, the second transducer may be disposed within the second sector 422 of the sensor assembly 400, and the third transducer and the fourth transducer may be disposed within the third sector 423 of the sensor assembly 400. The first transducer may form a first half of a first Wheatstone bridge and the third transducer may form a second half of the first Wheatstone bridge. Similarly, the second transducer may form a first half of a second Wheatstone bridge and the fourth transducer may form a second half of the second Wheatstone bridge. The first transducer may be disposed on, near or within the first header, the second transducer may be disposed on, near or within the second header, and the third transducer and the fourth transducer may be disposed on, near or within the third header. The housing 411 may be used to attach or secure the sensor assembly 400 to another structure, protect all or a portion of the sensor assembly 400, provide a means to handle or place the sensor assembly 400, or another similar characteristic. The housing 411 may be used to form an O-ring seal, may be threaded, may include a series of O-rings or bolts, or the like so that the sensor assembly 400 may be attached to another structure. In one example, the housing 411 may be made of a thermally conductive material such as metal.

In FIG. 4, the housing 411 may be disposed around and form the first port 407, the second port 408, and the third port 413. The first port 407 may allow the first pressure to enter the housing 411 for measurement by the first transducer, the second port 408 may allow the second pressure to enter the housing 411 for measurement by the second transducer, and the third port 413 may allow the third pressure to enter the housing 411 for measurement by the third transducer and the fourth transducer. In one example, the first pressure at the first port 407 may be a first main pressure, the second pressure at the second port 408 may be a second main pressure, and the third pressure at the third port 413 may be an atmospheric pressure. A first differential pressure signal may be generated by determining a first difference between the first pressure signal and the third pressure signal. Similarly, a second differential pressure signal may be generated by determining a second difference between the second pressure signal and the fourth pressure signal. The first differential pressure signal and the second differential pressure signal may be used to compensate for any thermal gradients in the sensor assembly 400. The first differential pressure signal and the second differential pressure signal may be provided by the sensor assembly 400 to a remote device, wherein the remote device may use the first differential pressure signal and the second differential pressure signal to perform temperature compensation in generating a temperature-compensated pressure signal.

In another embodiment, a sensor assembly may be configured to include a first transducer, a second transducer, a third transducer, a fourth transducer, a first header, a second header, a third header, a fourth header, a first port, a second port, a third port, a fourth port and a housing. The first header may be disposed within a first sector of the sensor assembly, the second header may be disposed within a second sector of the sensor assembly, the third header may be disposed within a third sector of the sensor assembly, and the fourth header may be disposed within a fourth sector of the sensor assembly. Similarly, the first transducer may be disposed within the first sector of the sensor assembly, the second transducer may be disposed within the second sector of the sensor assembly, the third transducer may be disposed within the third sector of the sensor assembly, and the fourth transducer may be disposed within the fourth sector of the sensor assembly. The first transducer may form a first half of a first Wheatstone bridge and the third transducer may form a second half of the first Wheatstone bridge. Similarly, the second transducer may form a first half of a second Wheatstone bridge and the fourth transducer may form a second half of the second Wheatstone bridge. The first transducer may be disposed on, near or within the first header, the second transducer may be disposed on, near or within the second header, the third transducer may be disposed on, near or within the third header, and the fourth transducer may be disposed on, near or within the fourth header. The housing may be used to attach or secure the sensor assembly to another structure, protect all or a portion of the sensor assembly, provide a means to handle or place the sensor assembly, or another similar characteristic. The housing may be used to form an O-ring seal, may be threaded, may include a series of O-rings or bolts, or the like so that the sensor assembly may be attached to another structure. In one example, the housing may be made of a thermally conductive material such as metal.

Furthermore, the housing may be disposed around and form the first port, the second port, the third port and the fourth port. The first port may allow the first pressure to enter the housing for measurement by the first transducer, the second port may allow the second pressure to enter the housing for measurement by the second transducer, the third port may allow the third pressure to enter the housing for measurement by the third transducer, and the fourth port may allow the fourth pressure to enter the housing for measurement by the fourth transducer. In one example, the first pressure at the first port may be a first main pressure, the second pressure at the second port may be a second main pressure, the third pressure at the third port may be a first reference pressure, and the fourth pressure at the fourth port may be a second reference pressure. A first differential pressure signal may be generated by determining a first difference between the first pressure signal and the third pressure signal. Similarly, a second differential pressure signal may be generated by determining a second difference between the second pressure signal and the fourth pressure signal. The first differential pressure signal and the second differential pressure signal may be used to compensate for any thermal gradients in the sensor assembly. The first differential pressure signal and the second differential pressure signal may be provided by the sensor to a remote device, wherein the remote device may use the first differential pressure signal and the second differential pressure signal to perform temperature compensation in generating a temperature-compensated pressure signal.

In another embodiment, a port may be configured to receive a pressure having a static pressure component and a dynamic pressure component. Further, the port may filter at least a portion of the dynamic pressure component of the pressure.

In another embodiment, a predetermined resonance frequency of a port may be used to determine at least one of a length and a cross-sectional area of the port. A person of ordinary skill in the art will recognize techniques for determining dimensions of a mechanical filter to achieve a predetermined resonance frequency.

In another embodiment, a port may have a shape of a spiral.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned sensor having thermal gradients, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A sensor housing apparatus, comprising:
   a transducer assembly housing characterized by:
   a first recess;
   a second recess;
   a first port defined in the housing, the first port extending from the first recess and through a first channel to a first opening in an end portion of the housing; and
   a second port defined in the housing, the second port extending from the second recess and in communication with one or more respective side port openings in a side portion of the housing.

2. The sensor housing apparatus of claim 1, wherein the housing comprises one-piece, and wherein the housing is thermally conductive.

3. The sensor housing apparatus of claim 1, wherein the housing comprises metal.

4. The sensor housing apparatus of claim 1, further comprising a first transducer assembly mated within at least a portion of the first recess and in communication with the first port.

5. The sensor housing apparatus of claim 4, wherein the first transducer assembly comprises:
   a first transducer; and
   a first header coupled to the first transducer.

6. The sensor housing apparatus of claim 1, further comprising a second transducer assembly mated within at least a portion of the second recess and in communication with the second port.

7. The sensor housing apparatus of claim 6, wherein the second transducer assembly comprises:
   a second transducer; and
   a second header coupled to the second transducer.

8. The sensor housing apparatus of claim 1, wherein the first port is configured for communication with a first pressure.

9. The sensor housing apparatus of claim 1, wherein the second port is configured for communication with a reference pressure.

10. The sensor housing apparatus of claim 1, wherein the first recess and the second recess are laterally equidistant from a front surface of the housing.

11. The sensor housing apparatus of claim 1, wherein the end portion of the housing comprises a surface for mounting the housing to another structure.

12. The sensor housing apparatus of claim 1, wherein the first recess and the second recess are positioned symmetrically relative to a longitudinal axis of the housing.

13. A method, comprising:
   providing a transducer assembly housing;
   defining, in the housing, a first recess configured for securing and at least partially embedding a corresponding first transducer assembly within the housing;
   defining, in the housing, a second recess configured for securing and at least partially embedding a corresponding second transducer assembly within the housing;
   configuring a first port to extend from the first recess and through an end portion of the housing such that the first port is configured for communication with a first pressure; and
   configuring a second port to extend from the second recess and in communication with one or more respective side port openings in a side portion of the housing such that the second port is defined in the housing and configured for communication with a reference pressure.

14. The method of claim 13, further comprising:
   coupling, to the first recess, a first header; and
   coupling, to the first header, a first transducer, wherein the first transducer is in communication with the first port.

15. The method of claim 13, further comprising:
   coupling, to the second recess, a second header; and
   coupling, to the second header, a second transducer, wherein the second transducer is in communication with the second port.

16. The method of claim 13, wherein the housing is made from a thermally conductive material.

17. The method of claim 13, wherein the first pressure is characterized by a dynamic pressure having a first temperature, and wherein the reference pressure is characterized by atmospheric pressure, wherein the atmospheric pressure is characterized by a static pressure having a second temperature that differs from the first temperature.

18. The method of claim 13, wherein the housing comprises a one-piece thermally conductive metal material disposed around and forming the first port and the second port.

19. The method of claim 13, wherein the first recess and the second recess are positioned in the one-piece housing such that a temperature of the first recess is about equivalent to a temperature of the second recess during operation.

20. The method of claim 13, further comprising thermally coupling a first header and a second header to the respective first recess and second recess of the housing.

* * * * *